(12) United States Patent
Yao et al.

(10) Patent No.: US 9,071,887 B2
(45) Date of Patent: Jun. 30, 2015

(54) MEDIA SESSION HEARTBEAT MESSAGING

(71) Applicant: Verizon Patent and Licensing Inc., Basking Ridge, NJ (US)

(72) Inventors: Xuefeng Yao, Weston, MA (US); Jack Jianxiu Hao, Lexington, MA (US); Sandeep G. Rathi, Woburn, MA (US); Zhiying Jin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 212 days.

(21) Appl. No.: 13/651,872

(22) Filed: Oct. 15, 2012

(65) Prior Publication Data
US 2014/0108497 A1    Apr. 17, 2014

(51) Int. Cl.
| | |
|---|---|
| G06F 15/16 | (2006.01) |
| H04N 21/854 | (2011.01) |
| H04N 21/2387 | (2011.01) |
| H04N 21/41 | (2011.01) |
| H04N 21/442 | (2011.01) |
| H04N 21/4627 | (2011.01) |
| H04N 21/845 | (2011.01) |
| H04L 29/06 | (2006.01) |
| H04L 12/26 | (2006.01) |

(52) U.S. Cl.
CPC ..... *H04N 21/85406* (2013.01); *H04N 21/2387* (2013.01); *H04N 21/4126* (2013.01); *H04N 21/44204* (2013.01); *H04N 21/4627* (2013.01); *H04N 21/8456* (2013.01); *H04L 43/106* (2013.01); *H04L 65/00* (2013.01); *H04L 65/4084* (2013.01); *H04L 65/4092* (2013.01)

(58) Field of Classification Search
None
See application file for complete search history.

(56) References Cited

U.S. PATENT DOCUMENTS

| | | | |
|---|---|---|---|
| 2003/0074486 A1* | 4/2003 | Anastasiadis et al. | 709/321 |
| 2006/0117352 A1* | 6/2006 | Yamagata et al. | 725/50 |
| 2007/0136679 A1* | 6/2007 | Yang | 715/772 |
| 2008/0016537 A1* | 1/2008 | Little et al. | 725/81 |
| 2008/0039032 A1* | 2/2008 | Haumont | 455/115.1 |
| 2008/0040759 A1* | 2/2008 | She et al. | 725/81 |
| 2009/0228939 A1* | 9/2009 | Qi et al. | 725/93 |
| 2010/0017474 A1* | 1/2010 | Kandekar et al. | 709/205 |
| 2011/0029597 A1* | 2/2011 | Morinaga | 709/203 |
| 2011/0158090 A1* | 6/2011 | Riley et al. | 370/230 |
| 2012/0113895 A1* | 5/2012 | Diachina et al. | 370/328 |
| 2012/0158827 A1* | 6/2012 | Mathews | 709/203 |
| 2012/0210356 A1* | 8/2012 | Kiok et al. | 725/39 |
| 2013/0003543 A1* | 1/2013 | Ludwig | 370/230 |
| 2013/0151728 A1* | 6/2013 | Currier | 709/248 |
| 2013/0169742 A1* | 7/2013 | Wu et al. | 348/14.08 |
| 2013/0185421 A1* | 7/2013 | Yang, Shengqiang | 709/224 |
| 2013/0191929 A1* | 7/2013 | Yin et al. | 726/28 |
| 2013/0271568 A1* | 10/2013 | Park et al. | 348/43 |

* cited by examiner

Primary Examiner — Melvin H Pollack
Assistant Examiner — Oluwatosin Gidago

(57) ABSTRACT

A client device plays streaming media, and obtains a media playback position of the media at a first time. The client device sends a first message from the client device to a server, wherein the first message includes the media playback position and where the media playback position includes a time reference associated with playback of the media at the first time. The client device receives a first reply message from the server, wherein the first reply message indicates a time period. The client device sends a second message from the first client to the server, based on expiration of the time period, wherein the second message includes a media playback position of the media at a second time during the playing of the streaming media that is different than the first time.

24 Claims, 10 Drawing Sheets

MEDIA SESSION HEARTBEAT MESSAGING

BACKGROUND

Hypertext Transfer Protocol (HTTP) Live Streaming (HLS) is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates or different resolutions. At the beginning of a streaming session, the client downloads a playlist file that specifies the different or alternate streams that are available.

In HLS, a given multimedia presentation is specified by a Uniform Resource Identifier (URI) to the playlist file, which itself consists of an ordered list of media URIs and informational tags. Each media URI either refers to a media file that is a segment of a single continuous media stream, or to another playlist file. A playlist file may be organized as set forth in the Internet Engineering Task Force (IETF) draft entitled "HTTP Live Streaming" dated Nov. 19, 2010. To play a stream, a client first obtains the playlist file and then obtains and plays each media file in the playlist in sequence.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable the shifting of media sessions between clients and/or media devices using "heartbeat" messaging that provides a current media playback position and playback status for the streaming media sessions to a remote server. The remote server, referred to herein as a "heartbeat server" maintains a database that stores, among other data, the media playback position and playback status for streaming media sessions. When a session is shifted from one client to another client, or from one media device to another media device, the media playback position and playback status for the streaming media session may be retrieved from the database and used as a basis for continuing the streaming media session at the second client or the second media device. The information for the active streaming media sessions for a given user stored in the database may also be used to control the number of simultaneous media streams being streamed to a same user. For example, a given user with n currently active streaming media sessions may be denied permission to engage in a (n+1)th streaming media session based on information stored in the database collected from heartbeat messages for that user.

Figure 1:
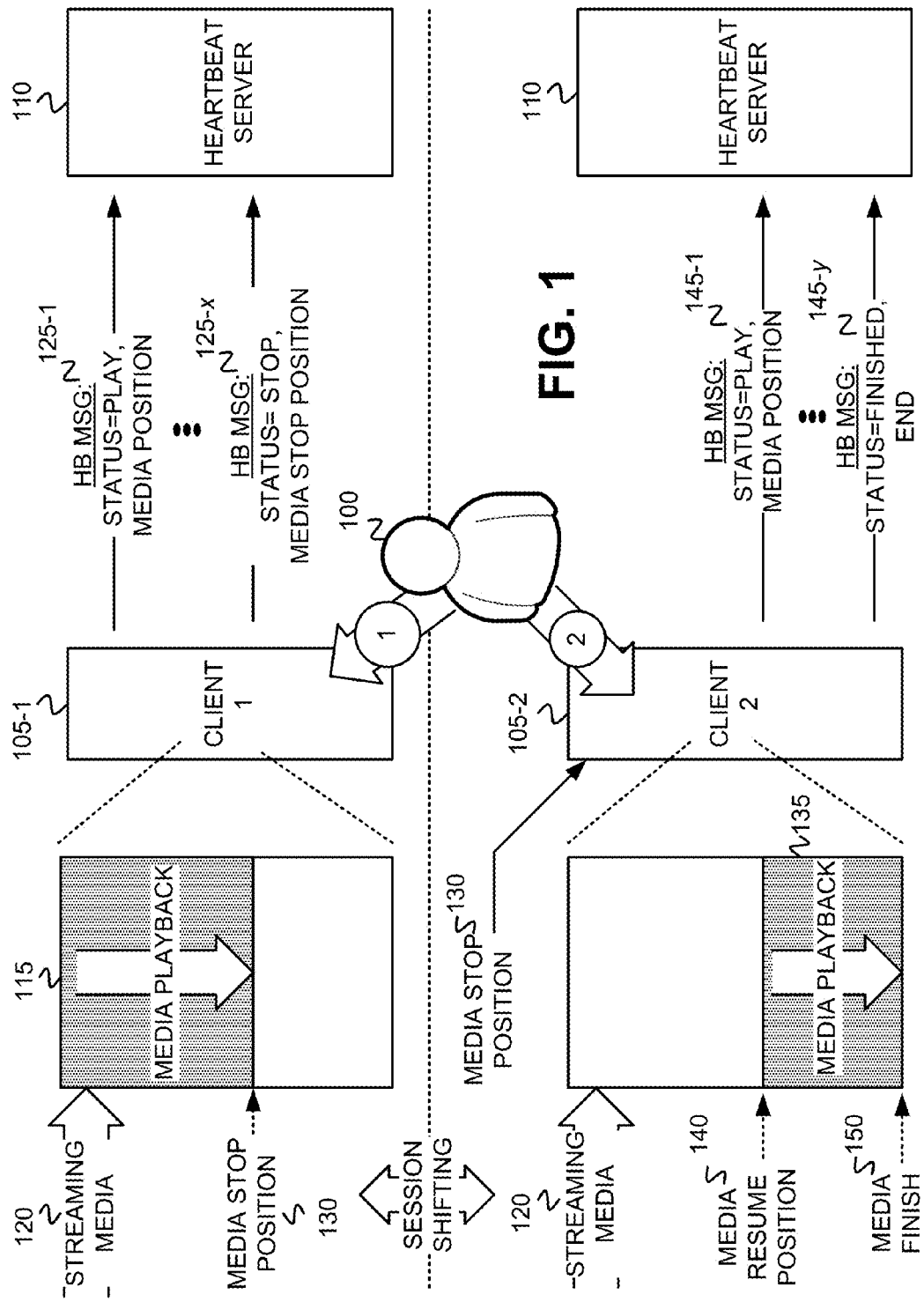
FIG. 1 illustrates an overview of the use of heartbeat messaging for delivering the playback status and current media playback position associated with streaming media played at clients to a server.

FIG. 1 illustrates an overview of the use of heartbeat messaging for delivering the playback status and current media playback position, associated with streaming media played at clients, to a server for session shifting and for controlling the simultaneous streaming of multiple media streams to a same user. A user 100 may use a client 105-1 to playback 115 streaming media 120 received at client 105-1 during a session. During playback 115 of streaming media 120, client 105-1 may send heartbeat messages 125-1 to 125-x to a heartbeat server 110 that include information such as, for example, a playback status of the streaming media during the session, and a current playback position of the media during playback 115. The playback status of the streaming media may include "stopped," "paused," "finished," and "playing." In one embodiment, the current playback position of the media during playback 115 may include a time reference associated with playback of the media. For example, if a media item is 15 minutes in length, then the playback time reference may be the point in time within the 15 minutes that playback has reached (e.g., 2 minutes, 35 seconds). In an embodiment where the media is streamed using HLS, the current media position of the media may include the current media URI in the playlist file, where the current media URI refers to a specific media file that is a segment of the continuous media stream.

The heartbeat messages may be sent repeatedly from client 105-1 to server 110 during the session such as, for example, at periodic intervals. FIG. 1 depicts a sequence of heartbeat messages 125-1 through 125-x being sent from client 105-1 to heartbeat server 110 during playback 115 of streaming media 120.

At some point during playback 115 of streaming media 120, user 100 may stop playback 115 and further may temporarily end the media playback session. When client 105-1 receives the "stop" command from user 100, client 105-1 may determine a position of playback of the media that has been reached at the time that the "stop" command was received. Client 105-1 may identify the determined media playback position as media stop position 130. Client 105-1 may send a last heartbeat message 125-x to heartbeat server 110, where message 125-x includes a playback status of "stop" and media stop position 130.

Subsequent to user 100 stopping playback 115 and temporarily ending the media playback session, user 100 may choose to shift the streaming media session to another client 105-2. Client 105-2 may obtain media stop position 130, either directly or indirectly from heartbeat server 110, and resume receiving streaming media 120, with playback 135 of the shifted session beginning at a media resume position 140 which corresponds to media stop position 130.

During playback 135 of the remainder of streaming media 120, client 105-2 may send heartbeat messages 145-1 to 145-y to heartbeat server 110 that include information such as, for example, the playback status of the streaming media during the shifted session, and a current position of the media during playback 135. Heartbeat messages 145-1 to 145-y may be sent repeatedly from client 105-2 to server 110 during the session such as, for example, at periodic intervals. FIG. 1 depicts a sequence of heartbeat messages 145-1 through 145-y being sent from client 105-2 to heartbeat server 110 during playback 135 of streaming media 120.

When streaming media 120 has finished 150, client 105-2 may send a final heart message to heartbeat server 110 to note the completion of the media for this streaming media session. As shown in FIG. 1, client 105-2 may send heartbeat message 145-y, which identifies the playback status as "finished."

Figure 2:
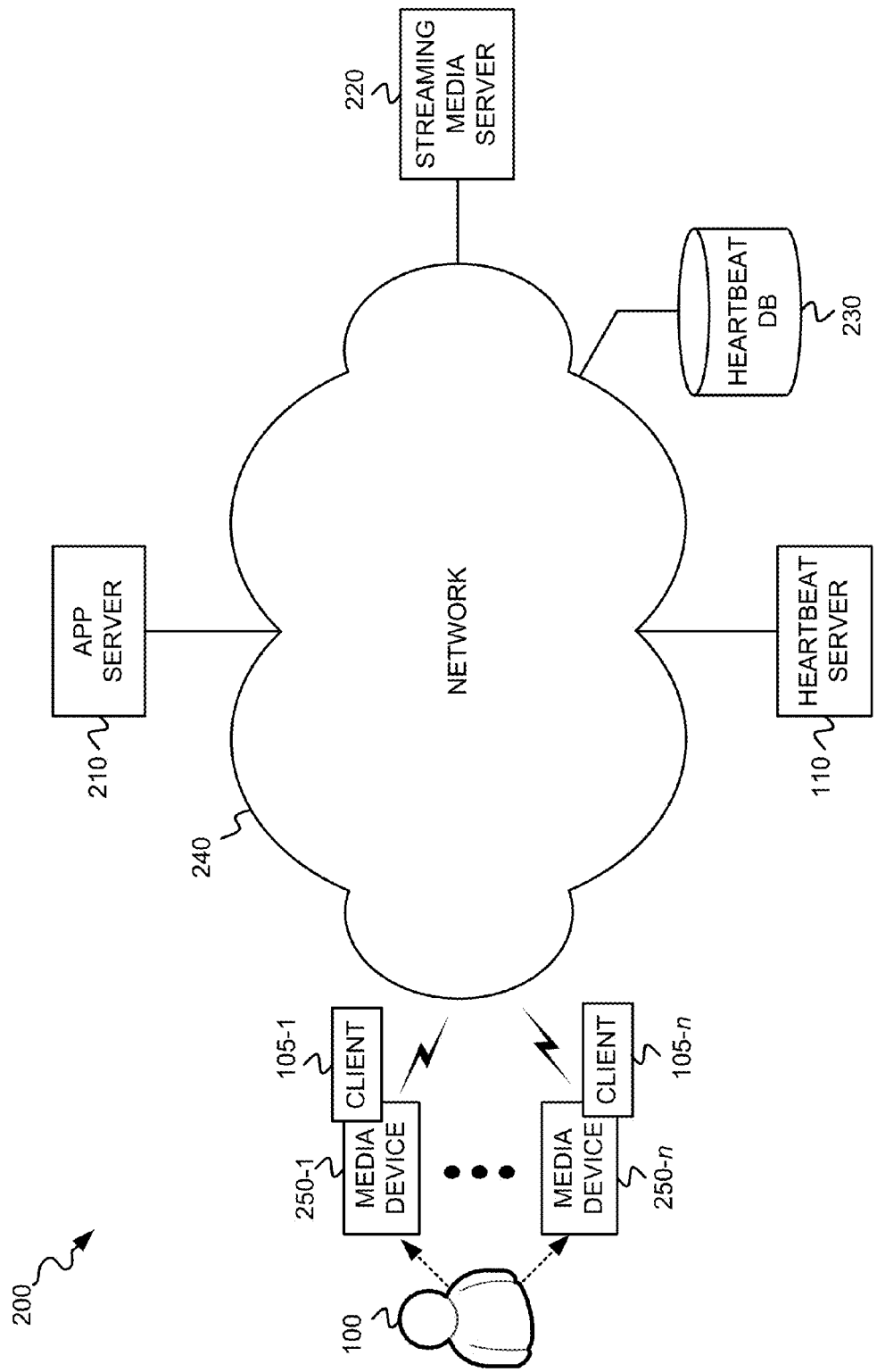
FIG. 2 depicts an exemplary network environment in which heartbeat messaging, for delivering the playback status and current media playback position of streaming media, can be implemented.

FIG. 2 depicts an exemplary network environment 200 in which heartbeat messaging, for delivering the playback status and current media playback position of streaming media, may be implemented. Network environment 200 may include multiple clients 105-1 through 105-n, an application (app) server 210, a streaming media server 220, heartbeat server 110, a heartbeat database (DB) 230, and a network 240. Clients 105-1 through 105-n may be executed by respective media devices 250-1 through 250-n. As shown in FIG. 2, a single user 100 may use media devices 250-1 through 250-n. Additional users and media devices (not shown) may connect to network 240 for receiving streaming media from app server 210 or streaming media server 220.

Media devices 250-1 through 250-n (individually and generically referred to herein as "media device 250," and collectively referred to herein as "media devices 250") may include any type of electronic device that may play media (e.g., audio and/or video media) and that may connect with network 240 via a wired or wireless connection. Media device 250 may include, for example, a digital media playing device (e.g., a MP3 player), a cellular telephone (e.g., a smart phone), a personal digital assistant (PDA), a computer (e.g., table, desktop, palmtop, or laptop), or a set-top box (STB) involved in delivering media via a cable or satellite network to user 100.

Clients 105-1 through 105-n (individually and generically referred to herein as "client 100," and collectively referred to herein as "clients 100") may each execute a respective media player that can "play" media streamed, or delivered by other means, to media devices 250-1 through 250-n. Client 105 may generate and send heartbeat messages to heartbeat server 110 during a given streaming media session. Client 105 may also interact with app server 210 to request the streaming of the media.

App server 210 includes a network device that may store Uniform Resource Locators (URLs) associated with media that can be streamed from either app server 210 or from streaming media server 220. App server 210 may deliver a URL for requested streaming media to client 105. Streaming media server 220 includes a network device that may store and stream multiple different items of media upon request. Streaming media server 220 may stream media based on URLs contained in requests, wherein the URLs identify the item of media to be streamed.

Heartbeat server 110 includes a network device that receives heartbeat messages from clients 105, extracts the contents from the heartbeat message, including, among other data, media playback status and media playback position, and stores the contents in heartbeat DB 230. Heartbeat DB 230 may store the contents of heartbeat messages received from heartbeat server 110. The contents may include, as described in further detail below with respect to FIG. 6, a session identifier, a device identifier, a playback status, a media position, a heartbeat timestamp, an account identifier, and a heartbeat access token. Heartbeat server 110 may retrieve the contents of heartbeat DB 230 for one or more sessions to permit session shifting by a given user, and to control a number of simultaneous streaming media sessions in which a given user may be engaged.

Network 240 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network).

The configuration of network components of network environment 200 illustrated in FIG. 2 is for illustrative purposes. Other configurations may be implemented. Therefore, network environment 200 may include additional, fewer and/or different components that may be configured in a different arrangement than that depicted in FIG. 2.

Figure 3:
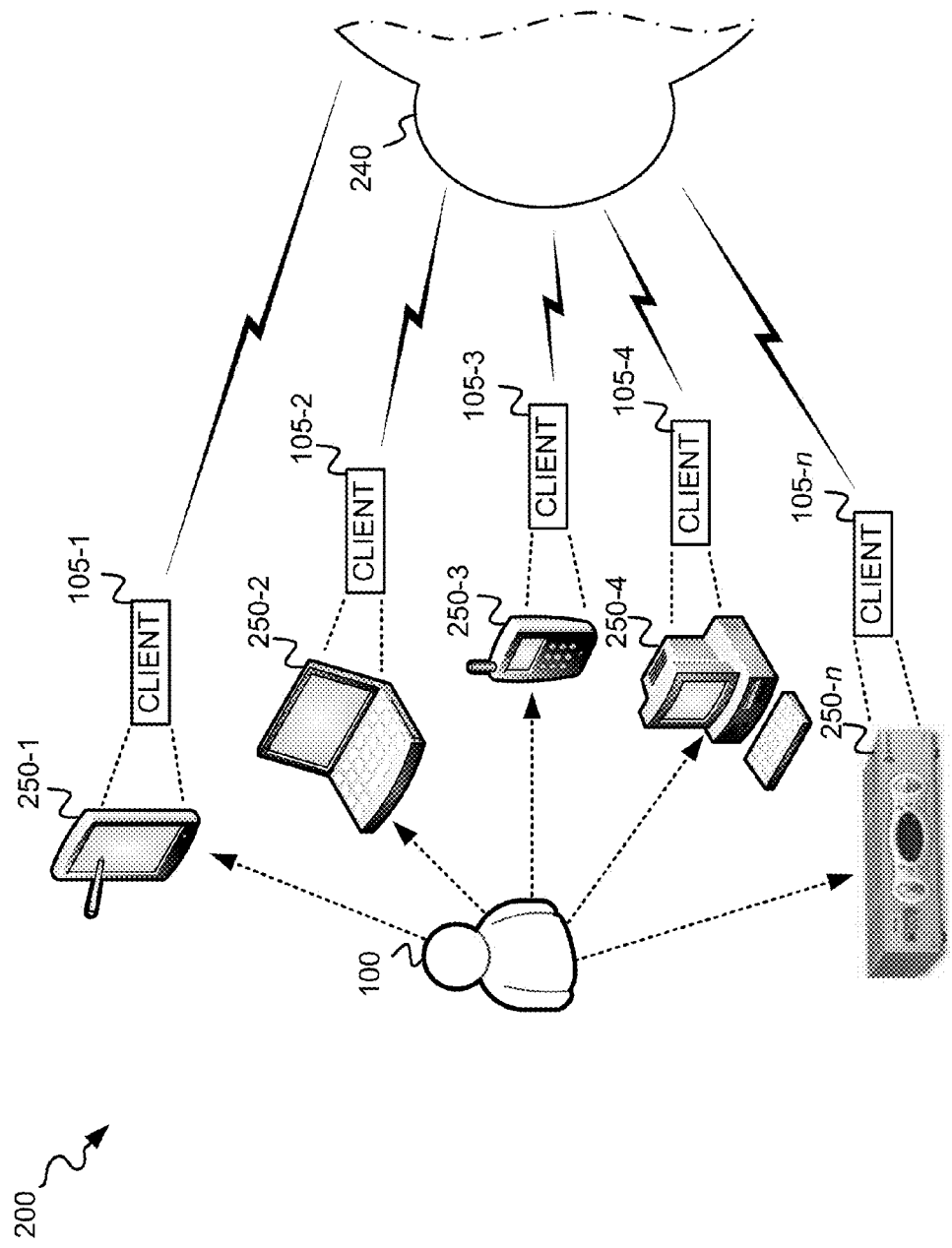
FIG. 3 depicts some specific examples of the media devices used in the network environment of FIG. 2.

FIG. 3 depicts some specific examples of media devices 250-1 through 250-n used in network environment 200. As shown, user 100 may use multiple different media devices 250-1 through 250-n, where each of the media devices may implement a respective one of clients 105-1 through 105-n for playing streaming media. In the specific examples depicted in FIG. 3, media device 250-1 may include a tablet computer, media device 250-2 may include a laptop computer, media device 250-3 may include a smart phone, media device 250-4 may include a desktop computer, and media device 250-n may include a STB. As described herein, user 100 may shift a given streaming media session between multiple different ones of media devices 250-1 through 250-n.

Figure 4:
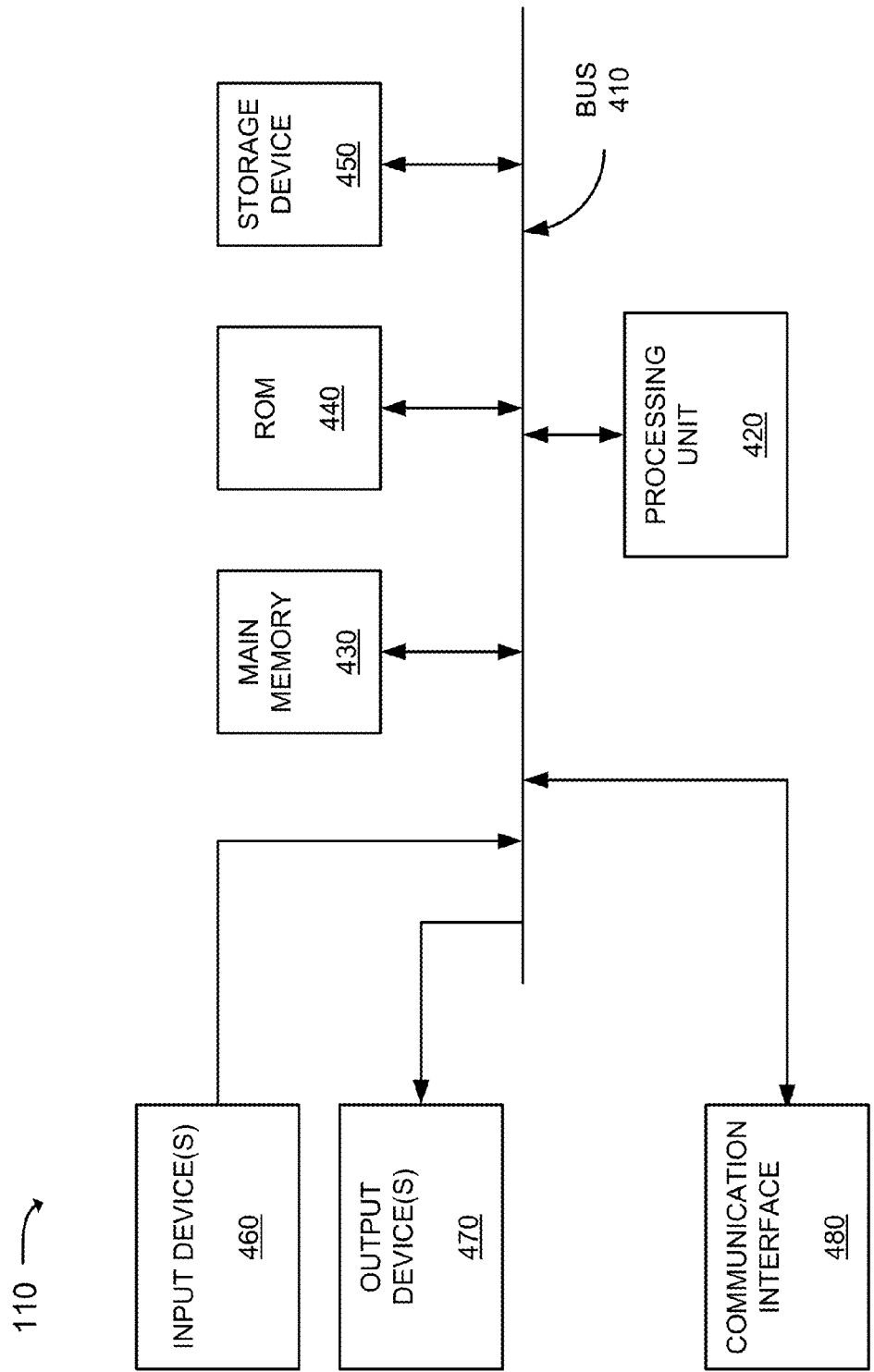
FIG. 4 is a diagram that depicts exemplary components of the heartbeat server of FIG. 2.

FIG. 4 is a diagram that depicts exemplary components of heartbeat server 110. Media devices 250-1 through 250-n, app server 210, streaming media server 220 and heartbeat DB 230 may be similarly configured. Heartbeat server 110 may include a bus 410, a processing unit 420, a main memory 430, a read only memory (ROM) 440, a storage device 450, an input device(s) 460, an output device(s) 470, and a communication interface(s) 480. Bus 410 may include a path that permits communication among the components of heartbeat server 110.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium." The process/methods set forth herein can be implemented as instructions that are stored in main memory 430, ROM 440 and/or storage device 450 for execution by processing unit 420.

Input device 460 may include one or more mechanisms that permit an operator to input information to heartbeat server 110, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include a transceiver that enables heartbeat server 110 to communicate with other devices and/or systems. For example, communication interface(s) 480 may include wired or wireless transceivers for communicating via network 240.

The configuration of components of heartbeat server 110 illustrated in FIG. 4 is for illustrative purposes. Other configurations may be implemented. Therefore, heartbeat server 110 may include additional, fewer and/or different components than those depicted in FIG. 4.

Figure 5:
FIG. 5 depicts an exemplary heartbeat message that may be sent from a client to the heartbeat server of FIG. 2.

FIG. 5 depicts an exemplary heartbeat message 500 that may be sent from a client 105 to heartbeat server 110. Heartbeat message 500 may include a device ID field 505, a session ID field 510, a HB timestamp field 515, a user ID field 520, a playback status field 525, a media position field 530, and a HB access token field 535.

Device ID field 505 may include a unique identifier for the media device 250 from which heartbeat message 500 originated. Session ID field 510 may include a unique identifier for a streaming media session being received by the media device 205 identified in field 505. HB timestamp field 515 may indicate a time at which heartbeat message 500 was generated and sent from the media device 250 identified in field 505. User ID field 520 may include a unique identifier that identifies user 100, or user 100's account. The account may include, for example, a media account, a subscription to which permits user 100 to access media at streaming media server 220.

Playback status field 525 may indicate a current playback status of media currently being streamed to the media device 250 identified in field 505. The playback status of the streaming media may include, for example, "stopped," "paused," "finished," and "playing." A playback status of "stopped" indicates that the media playback at media device 250 has been stopped. A playback status of "paused" indicates that the media playback at media device 250 has been temporarily paused. A playback status of "finished" indicates that the media playback at media device 250 has completed because the entirety of the media has been played back. A playback status of "playing" indicates that the media playback at media device 250 is currently still in a playback mode, and has not finished or been stopped or paused.

Media position field 530 may indicate a current playback position of the media currently being streamed to the media device 250 in the session identified by field 510. In one embodiment, the current playback position of the media may include a time reference associated with playback of the media. For example, if a media item is 15 minutes in length, then the time reference may be the point in time within the 15 minutes that playback has reached (e.g., 2 minutes, 35 seconds). In an embodiment where the media is streamed using HLS, the current media position of the media may include the current media URI in the playlist file, where the current media URI refers to a specific media file that is a segment of the continuous media stream.

HB access token field 535 may include a security token associated with the session identified by session ID field 510. The security token may include a secret key shared between heartbeat server 110 and app server 210, and delivered to client 105 at media device 205 for inclusion in heartbeat messages. The security token may also include a user ID of user 100, and a timestamp.

The number and content of the fields of heartbeat message 500 shown in FIG. 5 are for illustrative purposes. Different or additional fields may be included in message 500 than those shown. Therefore, heartbeat message 500 may include additional, fewer and/or different fields than those depicted in FIG. 5.

Figure 6:
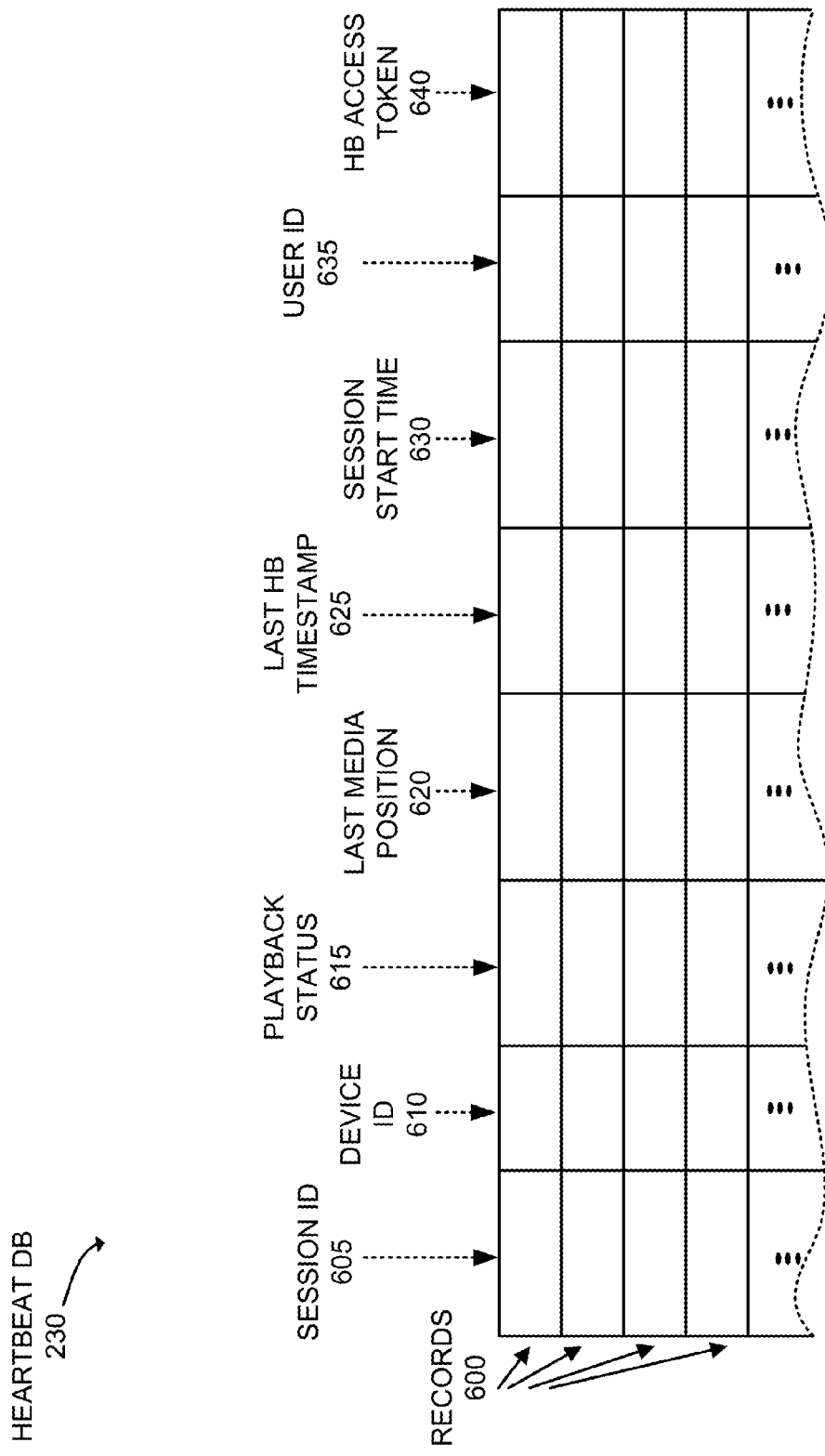
FIG. 6 illustrates exemplary details of the heartbeat database of FIG. 2.

FIG. 6 illustrates exemplary details of heartbeat DB 230. As shown, each record 600 of DB 230 may include a session identifier (ID) field 605, a device ID field 610, a playback status field 615, a last media position field 620, a last HB timestamp field 625, a session start time field 630, an account ID field 635, and a HB access token field 640.

Session ID field 605 may store a unique identifier for a streaming media session. Device ID field 610 may store a unique identifier for a media device 205 from which the heartbeat message whose contents are stored in record 600 originated. Playback status field 615 stores data that indicates a current or most recent playback status of the streaming media, identified by session ID field 605, at a client 105 executed by the media device identified by device ID field 610.

Last media position field 620 stores data that indicates the most recent media playback position of the streaming media identified by session ID field 605. Last media position field 620 may store the contents of media position field 530 contained in the most recently received heartbeat message 500 for the session identified by session ID field 605. Last HB timestamp field 625 stores the contents of HB timestamp field 515 contained in the most recently received heartbeat message 500 for the session identified by session ID field 605.

Session start time field 630 stores data indicating a time at which the session identified by session ID field 605 originally started. User ID field 635 may include a unique identifier that identifies user 100, or user 100's account. The account may include, for example, a media account, a subscription which permits user 100 to access media at streaming media server 220.

HB access token field 640 may include the security token contained in HB access token field 535 of the most recent heartbeat message 500 received for the session identified in session ID field 605. The security token may have been generated based on a secret key shared between heartbeat server 110 and app server 210, and delivered to client 105 at media device 205 for inclusion in heartbeat messages.

The number and content of the fields of each record 600 of heartbeat DB 230 in FIG. 6 is for illustrative purposes. Each record 600 of heartbeat DB 230 may include additional, fewer and/or different fields than those depicted in FIG. 6.

Figure 7:
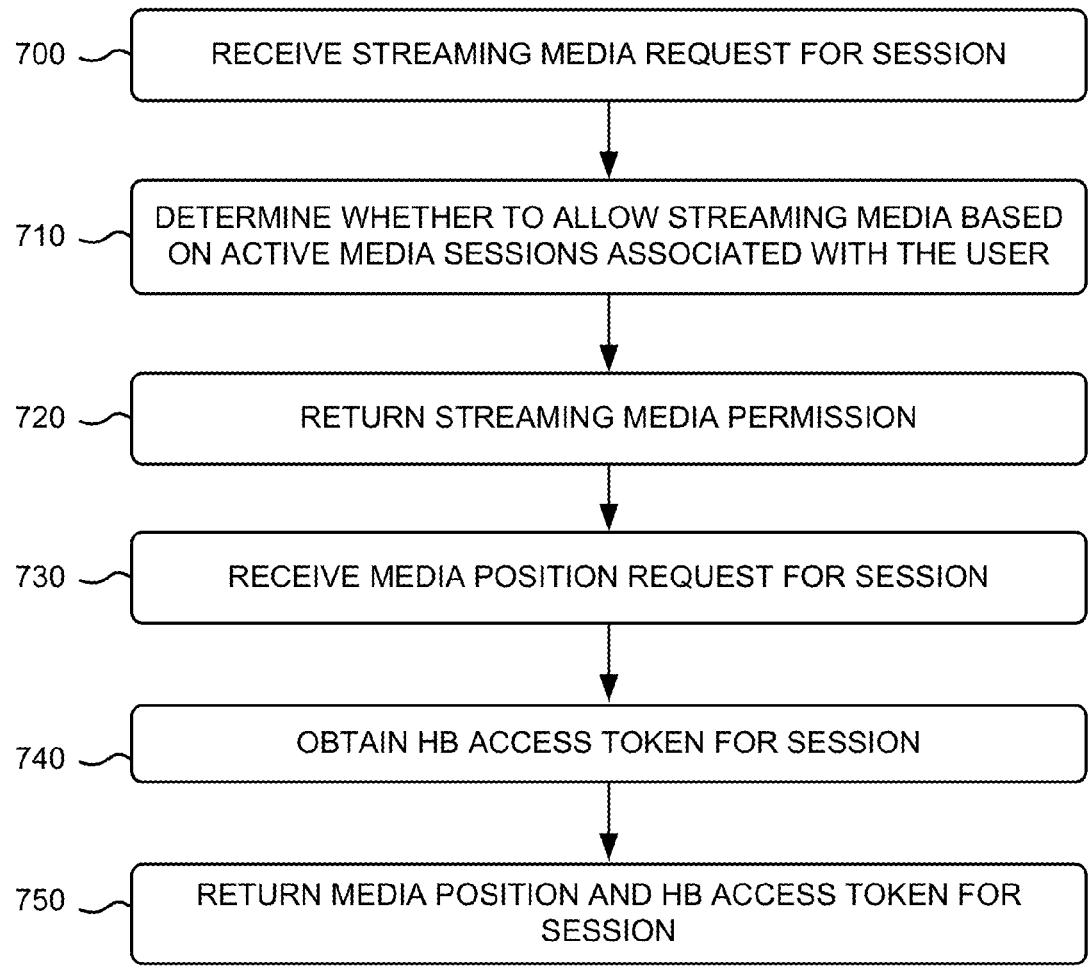
FIG. 7 is a flow diagram of an exemplary process for delivering media playback information for a media session at a client.

FIG. 7 is a flow diagram of an exemplary process for delivering media playback information for a media session at a client 105. The exemplary process of FIG. 7 may be implemented by heartbeat server 110. The exemplary process of FIG. 7 is described below with reference to the exemplary messaging diagram of FIG. 8. The exemplary process of FIG. 7 may be selectively repeated for each request to receive a streaming media session at a client 105.

The exemplary process may include heartbeat server 110 receiving a streaming media request for a session (block 700). As shown in the messaging diagram of FIG. 8, prior to heartbeat server 110 receiving the streaming media request, client 105 may start 800 media playback based on, for example, input from user 100. Client 105 may send a message 805 to app server 210 to obtain the playback URL of the streaming media for the session. In response to receipt of message 805, app server 210 may send a streaming media request message 810 to heartbeat server 110. Message 810 may identify the requesting device, the session ID, and the user ID.

Heartbeat server 110 may determine whether to allow the streaming media session based on active media sessions associated with the requesting user (block 710). Heartbeat server 110 may search heartbeat DB 230 to identify records 600 whose user ID 635 matches the user ID identified in message 805 received from app server 210. Based on records 600 identified by heartbeat server 110, heartbeat server 110 may determine the number of active media sessions for the requesting user. Heartbeat server 105 may determine whether to permit 815 the streaming media session based on a comparison of the determined number of active media sessions to a threshold level to determine whether the number of active media sessions is equal to or less than the threshold level. The threshold level may be a configurable value. If the determined number of active media sessions for the requesting user 100 is less than or equal to the threshold value, then heartbeat server 110 may send a message 820 granting permission for the streaming media session. If the determined number of active media sessions for the requesting user 100 is greater than the threshold value, then heartbeat server 110 may return a message (not shown in FIG. 8) denying the requested streaming media session.

Figure 8:
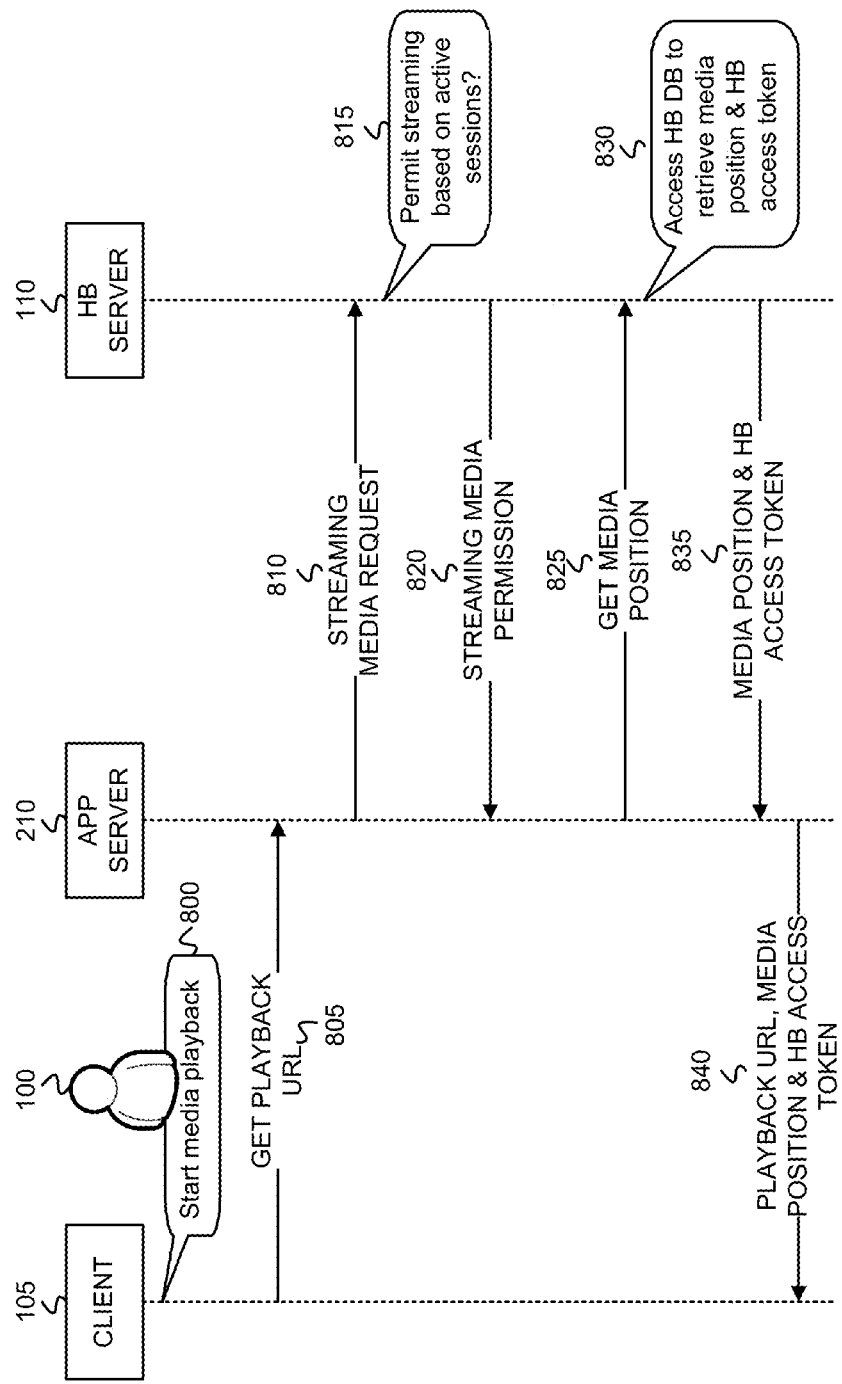
FIG. 8 is a messaging diagram associated with the exemplary process of FIG. 7.

Heartbeat server 110 may return permission for the streaming media session (block 720). As shown in FIG. 8, heartbeat server 110 returns a message 820 that grants permission to app server 210 for the requested streaming media session. Heartbeat server 110 may receive a media position request for the streaming media session (block 730). Subsequent to receiving streaming media permission message 820 from heartbeat server 110, app server 210 may send a get media position message 825 to heartbeat server 110 to obtain a current media playback position for the streaming media for the requested session. Get media position message 825 may, for example, identify the user ID and the session ID.

Heartbeat server 110 may obtain a heartbeat access token for the session (block 740). Based on the User ID and the session ID contained in the media position request, heartbeat server 110 may access 830 heartbeat DB 230 to retrieve a media playback position and a heartbeat access token from heartbeat DB 230. Referring to FIG. 6, heartbeat server 110 may locate a record 600 in heartbeat DB 230 whose session ID field 605 and user ID field 635 match the user ID and session ID contained in the media position request. Heartbeat server 100 may retrieve the contents of last media position field 620 and HB access token field 640 from the located record 600 in heartbeat DB 230.

Heartbeat server 110 may return the obtained media position and the heartbeat access token for the session for use by the requesting client (block 750). Heartbeat server 110 may, for example, send the retrieved media position and heartbeat access token to app server 210 via message 835. In turn, app server 210 may send a message 840 to client 105 that includes the media position and heartbeat access token received in message 835, and which also includes the playback URL requested by client 105 via message 805. Client 105, using the received playback URL, may request streaming of the media from streaming media server 220. During playback of the requested media, client 105 may send heartbeat messages to heartbeat server 110, as described below with respect to the exemplary process of FIG. 9.

Figure 9:
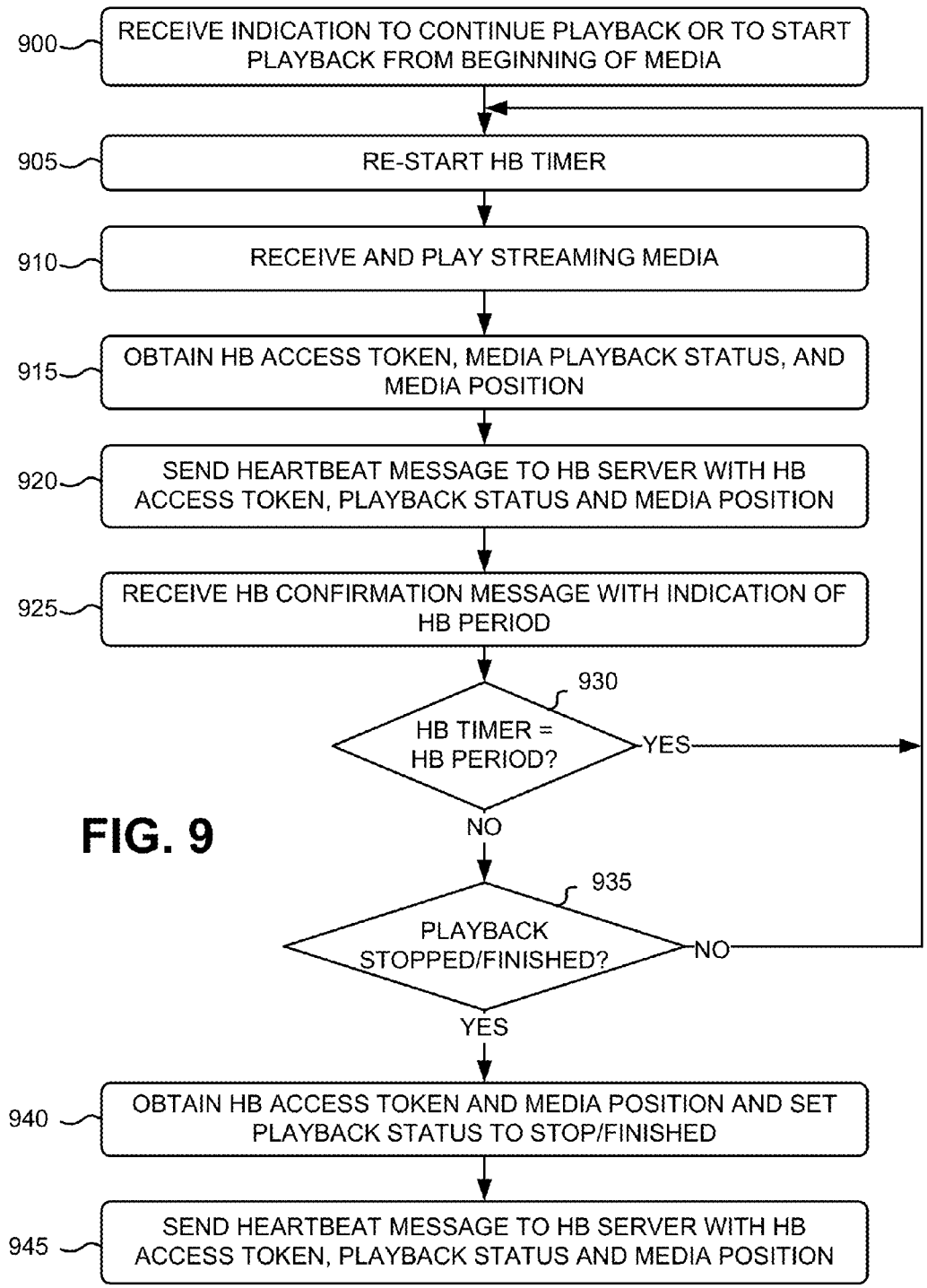
FIG. 9 is a flow diagram of an exemplary process for periodic heartbeat messaging from a client to the heartbeat server of FIG. 2 during streaming media playback.

FIG. 9 is a flow diagram of an exemplary process for periodic heartbeat messaging from client 105 to heartbeat server 110 during media playback. The exemplary process of FIG. 9 may be implemented by client 105, in conjunction with heartbeat server 110. The exemplary process of FIG. 9 is described below with reference to the exemplary messaging diagram of FIG. 10.

Figure 10:
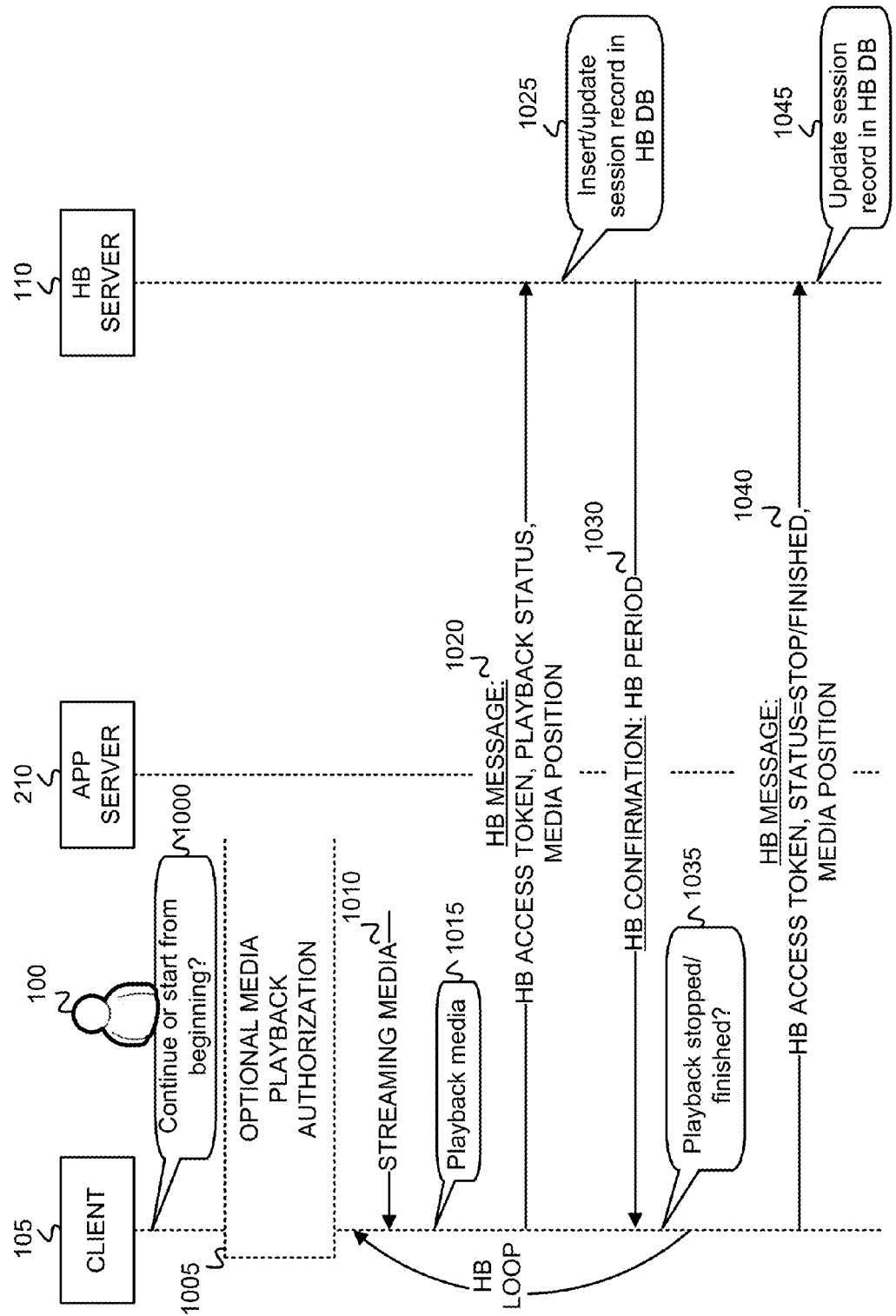
FIG. 10 is a messaging diagram associated with the exemplary process of FIG. 9.

The exemplary process may include client 105 receiving an indication to continue playback, or to start playback from the beginning of the media (block 900). As shown in FIG. 10, user 100 at client 105 may provide user input to client 105 instructing client 105 to continue 1000 playback of the media from the point that user 100 previously stopped playback of the media, or to start playback of the media from a beginning of the media. Client 105 may re-start a heartbeat timer (block 905). The heartbeat timer may count the passage of time such that the timer's time value can be compared to a heartbeat period set, for example, by heartbeat server 110. Re-starting of the heartbeat timer may include resetting the timer to an initial time value of zero. The heartbeat timer may then count upwards from the initial value of zero in increments of, for example, seconds, half-minutes, etc.

Client 105 may receive and playback streaming media (block 910). Prior to receipt and playback of the streaming media, client 105 may engage in an optional media playback authorization 1005. The playback authorization may include messaging associated with receiving authorization to access requested media at streaming media server 220. FIG. 10 depicts client 105 receiving streaming media 1010, and playing back 1015 the received media.

Client 105 may obtain a heartbeat access token, a media playback status associated with the streaming media, and a media position of the streaming media (block 915). Client 105 may determine the current media playback status of the streaming media (e.g., playing, pausing, stopped, finished) and the current playback media position of the streaming media. Client 105 may further retrieve a heartbeat access token stored in memory and previously received from heartbeat server 110 (e.g., block 750 of FIG. 7).

Client 105 may send a heartbeat message to heartbeat server 110 with the heartbeat access token, the playback status, and the media position (block 920). FIG. 10 depicts client 105 sending a heartbeat message 1020, which includes the heartbeat access token, the media playback status, and the media position, to heartbeat server 110. Heartbeat message 1020 may correspond to message 500 depicted in FIG. 5. As further shown in FIG. 10, upon receipt of heartbeat message 1020 from client 105, heartbeat server 110 may verify the authenticity of the heartbeat message based on the heartbeat access token, and may then insert or update 1025 a session record 600 in heartbeat DB 230. For example, heartbeat server 110 may extract the contents of fields 505-535 from heartbeat message 500, and may insert into appropriate fields in a record 600 of heartbeat DB 230. Client 100 may receive a heartbeat confirmation message from heartbeat server 110 with an indication of a heartbeat period (block 925). FIG. 10 depicts heartbeat server 110 returning a heartbeat confirmation message 1030 to client 105, with message 1030 including a heartbeat period specified by heartbeat server 110. The heartbeat period may indicate a specific time interval, or may indicate an increase (e.g., +10 seconds) or decrease (−5 seconds) in the current heartbeat period.

Client 105 may determine whether the heartbeat timer is equal to the heartbeat period (block 930). Client 105 may compare the current time value for the heartbeat timer to the duration of the heartbeat period indicated by the heartbeat confirmation message. If the heartbeat timer is equal to the heartbeat period (YES—block 930), then the exemplary process may loop back to block 905 to send another heartbeat message during the continued playback of the streaming media. FIG. 10 depicts the occurrence of the heartbeat loop ("HB loop") such that another heartbeat message 1020 may be sent from client 105 during the media streaming and media playback. If, for example, the heartbeat period is specified by heartbeat server 110 as 30 seconds, then every time that the heartbeat timer reaches 30 seconds during media playback, the heartbeat loop may repeat.

If the heartbeat timer is not equal to the heartbeat period (NO—block 930), then client 105 may determine whether media playback has been stopped by user 100 or has finished (block 935). If media playback has not been stopped or has not finished (NO—block 935), then the exemplary process may return to block 905 to send another heartbeat message during the continued playback of the streaming media. If media playback has stopped or finished (YES—block 935), then client 105 may obtain the heartbeat access token and the playback media position, and may set the playback status to stopped or finished (block 940). Client 105 may send a heartbeat message to heartbeat server 110 with the heartbeat access token, the playback status, and the playback media position (block 945). FIG. 10 depicts client 105 determining 1035 whether media playback has stopped or finished, and sending a heartbeat message 1040 with the heartbeat access token, playback status, and media position. Upon receipt of message 1040, heartbeat server 110 may update 1145 the appropriate session record 600 in heartbeat DB 230.

The exemplary processes of FIGS. 7 and 9 may be executed by two different clients 105 to shift a session from a first client 105-1 to a second client 105-2. Client 105-1 may execute the process of FIG. 7 to start a streaming media session. Client 105-1 may continue playback of the streaming media by executing the process of FIG. 9, with periodic sending of heartbeat message to heartbeat server 110. Client 105-1, upon stopping of the playback by user 100, sends a heartbeat message to the heartbeat server that includes the media playback position. The user may continue the streaming media session at client 105-2 (e.g., at a different media device) by executing the process of FIG. 7 to resume the streaming media session, and continuing playback of the resumed session by executing the process of FIG. 9.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7 and 9, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    initiating, at a first device associated with a user, a heartbeat timer in response to receiving user input to continue playback or to begin playback of media associated with a streaming media session;
    receiving the media associated with the streaming media session at the first device;
    playing the media at the first device;
    obtaining, at the first device and during the playing of the media, a heartbeat access token, a media playback status associated with the media, and a current playback position of the playing media;
    sending, at intervals during the playing of the media, messages from the first device to a network device that is separate from the first device, wherein each of the messages includes a session identifier (ID) associated with the streaming media session, the heartbeat access token, the media playback status, and the current playback position of the playing media at one of the intervals at which a respective one of the messages is sent;
    receiving, at the first device from the network device, a reply message corresponding to each one of the messages sent, wherein one or more reply messages specify a length of an interval;
    determining, at the first device and responsive to each of the reply messages, whether a time value of the heartbeat timer is less than the specified length;
    resetting, at the first device, the heartbeat timer responsive to a determination that the time value of the heartbeat timer is not less than the specified length;
    determining, at the first device and responsive to a determination that the time value of the heartbeat timer is less than the specified length, whether the streaming media session has ended;
    resetting, at the first device, the heartbeat timer responsive to a determination that the streaming media session has not ended; and
    obtaining, at the first device and responsive to a determination that the streaming media session has ended, the media playback status indicating that the streaming media session has ended and a corresponding media playback position.

2. The method of claim 1, wherein sending the messages during the playing of the media at the first device occurs at periodic intervals that vary in length.

3. The method of claim 1, further comprising:
    receiving, responsive to sending the messages from the first device to the network device, one or more reply messages from the network device that specify an increase or a decrease in the length of the interval between the most recent one of the messages and the next one of the messages.

4. The method of claim 3, wherein the messages are sent from the first device to the network device at the intervals as specified by the reply messages.

5. The method of claim 1, further comprising:
    using the session ID included in each of the messages for controlling a number of active streaming media sessions permitted for the user at a given period of time.

6. The method of claim 1, further comprising:
    using the current playback position of the media included in each of the messages for enabling the user to shift the streaming media session from the first device to a second device associated with the user.

7. The method of claim 1, wherein the current playback position includes a current media Uniform Resource Identifier (URI) in a playlist file associated with the media, and wherein the current media URI refers to a specific media file that is a segment of a continuous media stream.

8. The method of claim 1, wherein the media is received at the first device via a streaming media protocol that comprises Hypertext Transfer Protocol (HTTP) Live Streaming (HLS).

9. The method of claim 1, wherein the current playback position includes a time reference associated with playing of the media.

10. A method, comprising:
   initiating, at a first client of multiple clients associated with a user, a heartbeat timer in response to receiving user input to continue playback or to begin playback of media associated with a streaming media session;
   starting, responsive to receiving the user input, playback of the media at the first client;
   determining, at the first client, that the heartbeat timer is less than a specified time period;
   determining, at the first client and responsive to the determination that the heartbeat timer is less than the specified time period, that the streaming media session has ended;
   obtaining, at the first device and responsive to the determination that the streaming media session has ended, a media playback status indicating that the streaming media session has ended and a current playback position of the media;
   sending, from the first client to a network device, a first message that includes a session identifier associated with the streaming media session, a heartbeat access token, a media playback status, and the current playback position of the media;
   retrieving, at a second client of the multiple clients and from the network device, the current playback position of the media based on the session identifier; and
   resuming playback of the media, at the second client, from the retrieved current playback position of the media.

11. The method of claim 10, further comprising:
   receiving the media from a media server via a streaming media protocol, wherein the streaming media protocol comprises Hypertext Transfer Protocol (HTTP) Live Streaming (HLS).

12. The method of claim 11, wherein the current playback position includes a current media Uniform Resource Identifier (URI) in a playlist file associated with the media streamed via the streaming media protocol, and wherein the current media URI refers to a specific media file that is a segment of a continuous media stream.

13. The method of claim 10, wherein the current playback position includes a time reference associated with playback of the media.

14. The method of claim 10, further comprising:
   sending, from the second client to the network device, a second message that includes the session identifier, the current playback position of the media, and the current playback status, wherein sending the second message occurs after resuming playback of the media at an interval that is equal to or greater than the specified time period.

15. The method of claim 10, further comprising:
   receiving, at the first client, a value that defines the specified time period from the network device.

16. A device, comprising:
   a communication interface connected to a network via a wired or wireless link;
   a display; and
   a processing unit configured to:
      initiate a heartbeat timer in response to receiving user input, from a user associated with the device, to continue playback or to begin playback of streaming media,
      play, via the display, the streaming media,
      obtain a first media playback status associated with the streaming media, and a first media playback position of the streaming media, at a first time during the playing,
      send, via the communication interface, a first message from the device to a server, wherein the first message includes a session identifier (ID) for the streaming media, the first media playback status, and the first media playback position,
      receive, via the communication interface, a first reply message from the server, wherein the first reply message indicates a time period,
      compare, responsive to the first reply message, a time value of the heartbeat timer to the indicated time period,
      reset, based on the comparison, the heartbeat timer based on an expiration of the indicated time period,
      obtain, based on an expiration of the indicated time period, a second media playback status associated with the streaming media, and a second media playback position of the streaming media, at a second time during the playing, and
      send, via the communication interface, a second message to the server, based on the expiration of the indicated time period, wherein the second message includes the session ID, the second media playback status, and the second media playback position.

17. The device of claim 16, wherein the first message includes a an access token and the second message includes the access token, wherein the access token is used by the server to authenticate the first and second messages.

18. The device of claim 17, wherein the second media playback status comprises an indication of the streaming media being stopped, the streaming media being paused, the streaming media being finished, or the streaming media currently being played.

19. The device of claim 16, wherein the first media playback position includes a time reference associated with the playback of the streaming media.

20. The device of claim 16, wherein the processing unit is further configured to:
   receive, via the communication interface, a second reply message from the server, wherein the second reply message indicates a second time period, and
   send, via the communication interface, a third message from the device to the server, based on expiration of the second time period, wherein the third message includes a third media playback position of the streaming media at a third time.

21. A system, comprising:
   a first client, associated with a user, configured to:
      initiate a heartbeat timer in response to receiving user input to continue playback or to begin playback of media associated with a streaming media session,
      start, responsive to receiving the user input, playback of the media,
      determine that the heartbeat timer is less than a specified time period,
      determine, responsive to the determination that the heartbeat timer is less than the specified time period, that the streaming media session has ended, obtain, responsive to the determination that the streaming media session has ended, a media playback status indicating that the streaming media session has ended and a current playback position of the media, and send, to a network device, a first message that includes a session identifier associated with the streaming media session, a heartbeat access token, a media playback status, and the current playback position of the media; and a second client, associated with the user, configured to:

retrieve, from the network device, the current playback position of the media based on the session identifier; and resume playback of the media from the retrieved current playback position of the media.

22. The system of claim 21, wherein the current playback position includes a time reference associated with playback of the media.

23. The system of claim 21, wherein the second client is further configured to:

send, to the network device, a second message that includes the session identifier, the current playback position of the media, and the current playback status, wherein sending the second message occurs after resuming playback of the media at an interval that is equal to or greater than the specified time period.

24. The system of claim 21, wherein the first client is further configured to:

receive a value that defines the specified time period from the network device.

* * * * *